May 19, 1942.    M. S. JOHNSON    2,283,636
WEAR ELEMENTS FOR BRAKE HANGER BRACKETS
Filed Dec. 26, 1940
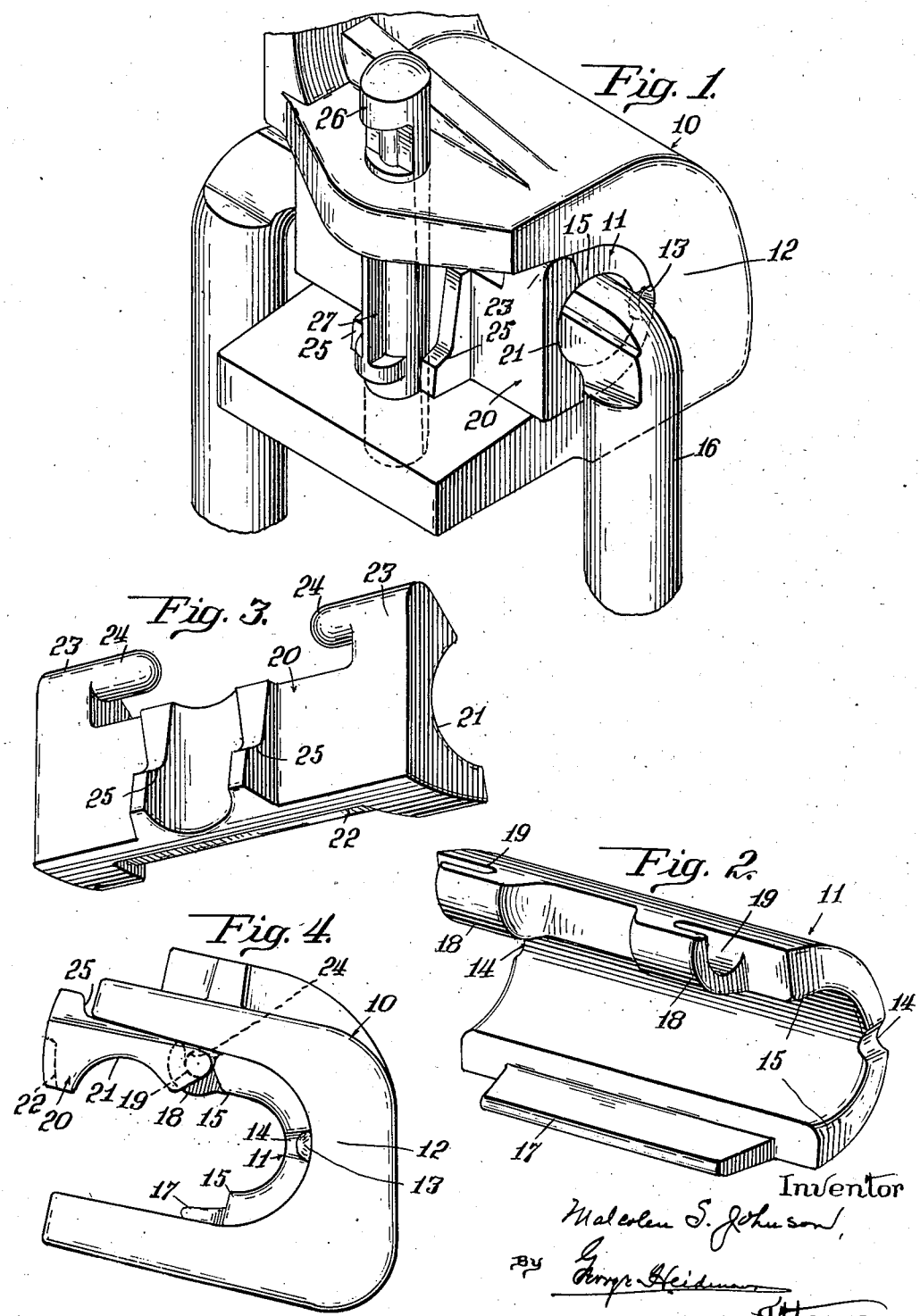

Patented May 19, 1942

2,283,636

UNITED STATES PATENT OFFICE 2,283,636

WEAR ELEMENTS FOR BRAKE HANGER BRACKETS

Malcolm S. Johnson, Chicago, Ill., assignor to Illinois Railway Equipment Company, Chicago, Ill., a corporation of Illinois Application December 26, 1940, Serial No. 371,662

10 Claims. (Cl. 188—209)

My invention relates to brake hanger holding wear elements adapted for use with the standard brackets at present in use on railroad cars and has for its object the provision of means whereby the brackets will be relieved of all wear resulting from the more or less constant vibratory movements of the brake hangers when the car is in service and thus eliminates the expense of renewing the brackets (which are integral with the truck side frames) which necessitates cutting off the worn bracket and welding a new bracket in place—an operation involving time and expense and also loss of car service.

The invention, in addition to its adaptability to standard brackets, hence without need for a special bracket, also has for its object the provision of elements adapted to present day types of brake hangers and made of suitable cast or forged metal to permit one of the complementary elements to be integrally secured in the bracket, as by welding, while the other or retainer element has interlocking pivotal engagement with its complementary element in order to permit the brake hangers to be easily inserted into place and removed without removing the elements.

A further object of the invention is the provision of a pair of complementary elements which completely encase the hanger and whose pivotal interengaging relation is such that removal of the outer or retainer element is impossible after the elements have been put in place in the bracket, so that loss of the retainer is impossible.

The invention also contemplates a structure wherein the hanger side thrusts will be transmitted through the usual fastening key or pin to the bracket, while preventing all wear on the bracket.

The above enumerated objects and advantages of my invention, as well as other advantages inherent therein, will all be readily comprehended from the following detailed description of the accompanying drawing wherein—

Figure 1 is a perspective view of the outer socketed end of a bracket with my improved wear elements in place; the bracket being shown with a suitable fastening key or pin and with the upper end of a suspended hanger.

Figure 2 is a perspective view of one of the wear elements, viewed from its forward or inner side.

Figure 3 is a perspective view, viewed from its outer side, of the complementary or retainer element.

Figure 4 is an end elevation of the bracket with the wear elements in place, showing the retainer element in open position.

In structures as heretofore employed, the brake hanger retainer element had to be entirely removed from the socket in the bracket to permit insertion or removal of the brake hanger and as a result the retainer element was frequently misplaced and lost during replacement of the hangers or repair of the brake rigging. This not only resulted in expense of replacement but also in improper mounting of the brake hanger before replacement was possible.

My improved structure is devised to eliminate all wear on the hanger brackets and to prevent the misplacement and difficulties mentioned and in its specific embodiment comprises a pair of complementary members which will completely encase the hanger and extend from end to end of the open sided socket formed by the vertically spaced jaws of the bracket of which a portion is shown at 10. The spacing between the jaws is materially greater than the cross-sectional dimensions of the upper end of the hanger and in order to prevent wear on the bracket it has been customary to provide wear elements in the sockets and separate retainer means for maintaining the hangers in the sockets; it being necessary to completely remove the retainers during insertion or removal of the brake hangers.

In Figure 2 I illustrate a wear element 11 of substantially semi-cylindrical formation adapted to fit the arcuate end walls 12 of the bracket 10 with the channeled side of the element disposed toward the open side of the socket in the bracket, as shown in Figures 1 and 4. The elements are preferably made of cast or forged metal which permits the element to be welded to the bracket as shown at 13 and therefore the ends of element 11 are provided with the shallow groove as at 14 to receive the added metal and at the same time provide a comparatively smooth surface at the ends of the bracket; it being understood that both ends of element 11 are welded to the bracket so that the element is immovably held in place.

The channeled side 15 is intended to receive the upper end of the brake hanger of which a portion is shown at 16, Figure 1; and the lower longitudinal side of the element is shown provided with the offset lip 17 which terminates short of the ends of the element, thus presenting an abutting surface extending throughout the length of the element 11. The upper longitudinal edge of element 11, at points spaced from the ends, is provided with a pair of forwardly disposed lobes 18, 18 each of which is provided with a socket 19 extending transversely of the lobe and open at the top and at one end; that is to say, the open ends of the sockets 19 are shown preferably disposed in opposite directions toward the adjacent ends of the element, see Figure 2; the lobes extending in the planes of the inner and outer top surfaces of the element.

A complementary element 20 is shown in Figure 3 and consists of a forged or cast metal block provided with an inner arcuate surface 21, complemental to the channel 15 of element 11, thereby providing a substantially cylindrical socket or channel for the upper end of the brake hanger 16.

The lower longitudinal side of element 20 is shown provided intermediate of its ends with a longitudinal recess 22 adapted to receive the lip 17 of element 11, thereby transmitting the side thrusts encountered by element 20 to the rigidly held element 11.

The upper longitudinal edge of element 20 adjacent its ends is provided with upstanding lobes 23, 23 which are formed to provide the opposingly disposed cylindrical trunnions 24, 24. The trunnions 24 are made to match and to seat in the sockets 19 of element 11 by inserting them through the open tops of sockets 19 before element 11 has been placed between the upper and lower jaws of the bracket 10; the trunnions 24 and their receiving sockets 19 are so formed that element 20 is free to swing upwardly into complete open position as shown in Figure 4.

The outer vertical face of element 20 at opposite sides of its vertical median line preferably is provided with the vertically extending ribs and lips 25 which define an arcuate socket therebetween which is adapted to substantially register with the usual keeper or bolt receiving holes in the upper and lower jaws of the bracket and permit passage of the keeper or bolt therethrough, as shown in Figure 1, where a keeper or pin 26 with an adaptor 27 is shown for purposes of exemplification; it being understood that any suitable type of pin or bolt may be employed.

As shown in Figure 1, the lips 25 extend to opposite sides of the fastening pin or keeper and as a result will transmit side thrusts encountered by element 20 to the bracket through the medium of the fastening pin or keeper, thereby, in conjunction with the lip 17, relieving the lobes and trunnions at the top of element 20 of the side thrusts or strains produced by the vibratory sidewise movements of the hanger.

In assembling the device, the complementary element 20 is first placed in juxtaposition with element 11 by inserting the trunnions 24 through the open tops of sockets 19 and with the lip 17 of element 11 disposed in the recess 22 of element 20. The assembled elements are then placed between the jaws of the hanger bracket and the element 11 immovably secured to the bracket by welding the ends as shown at 13. When the assembled elements are located in the socket of the bracket as described, it is apparent that the tops of the sockets 19 will be closed by the upper jaw of the bracket and removal of the trunnions 24 from the sockets will be impossible and dissociation of the two elements prevented; while on the other hand permitting the element 20 to be swung upwardly into complete open position as shown in Figure 4 to permit direct insertion of the upper end of the brake hanger 16 without need for tilting the hanger in a horizontal direction. The arcuate faces of both elements 11 and 20 are adapted to support the hanger 16 and to maintain the hanger out of contact with the bracket and hence prevent bracket wear.

After the hanger has been inserted into the channel formed by the opposing inner faces of the two elements, the element 20 is swung downwardly into complete closing position, as shown in Figure 1, and a suitable fastening key or bolt is then inserted through the registering holes usually formed in the upper and lower jaws of the bracket, with the key or bolt disposed between the ribs and lips 25 of element 20, as shown in Figure 1.

Should it become necessary to dismantle the brake mechanism, as for example because of breakage or undue wear of the hanger, this may easily be accomplished by simply removing the fastening key or bolt 26, which allows the element 20 to be swung upwardly into the position shown in Figure 4, which permits the hanger to be taken out directly from the socket without the necessity of tilting the same; the element 20, however, being locked in place and its misplacement or loss made impossible.

The construction disclosed in the drawing and described in the specification is believed to be the simplest embodiment of the invention which has been described in terms employed for purposes of description and not as terms of limitation as structural modifications are possible without, however, departing from the spirit of my invention.

What I claim is:

1. Wear elements for brake hanger brackets comprising a pair of elongated metal members adapted to be inserted in the socket of a brake hanger bracket in parallel relation with each other, the adjacent faces of the members being arcuate and combinedly forming a substantially cylindrical hanger receiving channel, one of said members being adapted to fit against the rear wall of the bracket socket and be immovably secured thereto, while the other member is pivotally secured to the first mentioned member to swing vertically to permit insertion or withdrawal of the brake hanger; and means whereby the second mentioned member is held against swinging movement.

2. Wear elements for brake hanger brackets comprising a pair of complementary members adapted to fit into the socket of a brake hanger bracket in face-to-face relation and to provide a hanger receiving socket, one of said members being adapted to fit against the rear wall of the bracket socket and to be immovably secured thereto; and means whereby the two members are pivotally secured together to permit the one member to swing into channel opening position.

3. Wear elements for brake hanger brackets comprising a pair of complemental elongated members provided with arcuate surfaces adapted to be arranged in juxtaposition to provide a hanger receiving channel therebetween, the longitudinal side of one member having a pair of socketed projections with the sockets opening in a direction perpendicular to the longitudinal axis of the channel, while the corresponding longitudinal side of the other member has a pair of trunnion providing projections adapted to seat in said projection sockets of the first mentioned member.

4. Wear elements for brake hanger brackets comprising a pair of complemental elongated members having dished faces adapted to be arranged in juxtaposition to combinedly provide a hanger receiving channel, the members at one of their contacting edges having trunnion and socket forming portions adapted to permit the one member to swing vertically within the bracket.

5. Wear elements for brake hanger brackets comprising a pair of complemental elongated members adapted to be arranged in juxtaposition and to provide a hanger receiving channel, the members at one of their contacting edges having interengaging pivot-providing means adapted to permit the one member to swing vertically when said members are inserted in the hanger bracket.

6. Wear elements for brake hanger brackets comprising a pair of complemental members adapted to be arranged in juxtaposition to provide a hanger receiving channel therebetween, the members at their upper contacting edges having pivot providing portions whereby one of the members may swing vertically when the members are arranged in the hanger bracket.

7. Wear elements for brake hanger brackets comprising a pair of complemental members adapted to be arranged in juxtaposition to provide a hanger receiving channel therebetween, the members at one of their contacting edges having oppositely disposed projections adapted to provide a pivotal relation between the members and permit the one member to swing vertically when the members are arranged in the bracket.

8. Wear elements for brake hanger brackets comprising, in combination with a socketed bracket, a pair of complemental members adapted to be arranged in juxtaposition in the socket of the bracket and to provide a hanger receiving channel therebetween, one of said members at its top having a pair of oppositely disposed trunnions while the other member at its top has a pair of sockets open at the top to receive said trunnions and adapted to be closed by a wall of the bracket, whereby the one member may be swung into channel opening position.

9. Wear elements for brake hanger brackets comprising, in combination with the socketed bracket of a truck frame, a pair of complemental members adapted to be arranged in juxtaposition forward of each other in the socket of the bracket and to provide a hanger receiving channel, one of said members at its upper longitudinal edge having upwardly opening sockets adapted to be closed by a wall of the bracket, while the other member at its upper longitudinal edge has a pair of oppositely disposed trunnions adapted to seat in the sockets of the first member and permit the second member to swing upwardly within the bracket socket, the lower longitudinal edges of the two members having interengaging surfaces, the outer face of the second mentioned member being provided with laterally spaced projections for passage of a locking pin therebetween.

10. Wear elements for brake hanger brackets comprising, in combination with the socketed hanger bracket of a truck frame, a pair of complemental elongated metal blocks adapted to be arranged in side-to-side relation in the socket of the truck frame bracket, the opposing sides of the blocks being grooved from end to end to combinedly provide a hanger receiving channel, one of the blocks above its grooved surface and intermediate its ends having forwardly presented lobes providing in their upper surfaces with sockets open at top and at the outer ends of the lobes, while the other block above its grooved surface and at its ends has a pair of lobes adapted to align with the outer ends of the lobes of the first mentioned block, the lobes of the second mentioned block on their inner sides and adjacent their upper ends having opposingly disposed trunnions adapted to seat in the sockets of the lobes of the first mentioned block before the blocks are inserted in the truck frame bracket and the second mentioned block permitted to swing upwardly for brake hanger insertion after the blocks are inserted in the bracket, the lower abutting edges of the two blocks being provided with interengaging surfaces whereby side thrusts encountered by the second mentioned block are transmitted to the first mentioned block.

MALCOLM S. JOHNSON.